United States Patent
Watanabe et al.

(10) Patent No.: US 6,345,348 B2
(45) Date of Patent: *Feb. 5, 2002

(54) MEMORY SYSTEM CAPABLE OF SUPPORTING DIFFERENT MEMORY DEVICES AND A MEMORY DEVICE USED THEREFOR

(75) Inventors: Naoya Watanabe; Akira Yamazaki, both of Hyogo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/798,950

(22) Filed: Feb. 11, 1997

(30) Foreign Application Priority Data

Apr. 24, 1996 (JP) .............................................. 8-102584

(51) Int. Cl.⁷ .............................................. G06F 12/06
(52) U.S. Cl. ...................... 711/170; 711/105; 711/156; 711/5
(58) Field of Search ................................. 711/156, 145, 711/105, 112, 114, 170, 171, 172, 506; 710/128; 713/1, 100

(56) References Cited

U.S. PATENT DOCUMENTS

| | | | | |
|---|---|---|---|---|
| 4,860,252 A | * | 8/1989 | Sykora ........................... | 711/5 |
| 4,980,850 A | * | 12/1990 | Morgan ....................... | 711/172 |
| 5,175,836 A | * | 12/1992 | Morgan ....................... | 711/115 |
| 5,179,686 A | * | 1/1993 | White ........................ | 711/172 |
| 5,353,431 A | * | 10/1994 | Doyle et al. ................. | 711/206 |
| 5,426,378 A | * | 6/1995 | Ong ............................. | 326/39 |
| 5,535,368 A | * | 7/1996 | Ho et al. ..................... | 711/170 |
| 5,572,692 A | * | 11/1996 | Murdoch et al. .............. | 711/5 |
| 5,584,010 A | * | 12/1996 | Kawai et al. ............... | 711/117 |
| 5,598,540 A | * | 1/1997 | Krueger ...................... | 711/170 |
| 5,630,098 A | * | 5/1997 | Vermeer et al. ............. | 711/172 |
| 5,661,677 A | * | 8/1997 | Rondeau, II et al. ......... | 365/63 |
| 5,732,407 A | * | 3/1998 | Mason et al. ............... | 711/104 |
| 5,737,766 A | * | 4/1998 | Tan ............................. | 711/170 |
| 5,740,401 A | * | 4/1998 | Hanawa et al. ............. | 711/152 |
| 5,761,464 A | * | 6/1998 | Hopkins ..................... | 710/130 |
| 5,801,985 A | * | 9/1998 | Roohparvar et al. ... | 365/185.01 |
| 5,821,996 A | * | 10/1998 | Kawamura et al. ......... | 348/232 |
| 5,822,782 A | * | 10/1998 | Humlicek et al. .......... | 711/170 |
| 5,835,436 A | * | 11/1998 | Ooishi ..................... | 365/230.03 |
| 5,860,080 A | * | 1/1999 | James et al. .................... | 711/4 |
| 5,862,320 A | * | 1/1999 | Nelsen et al. ................. | 714/42 |
| 5,901,105 A | * | 5/1999 | Ong et al. ............. | 365/230.06 |
| 5,937,423 A | * | 8/1999 | Robinson ..................... | 711/103 |
| 6,003,110 A | * | 12/1999 | Brandt et al. .................. | 711/5 |
| 6,065,092 A | * | 5/2000 | Roy .............................. | 711/5 |

FOREIGN PATENT DOCUMENTS

| JP | 56022122 A | * | 3/1981 |
| JP | 7-320481 | | 12/1995 |

* cited by examiner

Primary Examiner—Matthew Kim
Assistant Examiner—Pierre-Michel Bataille
(74) Attorney, Agent, or Firm—McDermott, Will & Emery (57) ABSTRACT

A memory includes an ROM portion storing information specific to the memory, and transfers the stored information to a memory controller via an output buffer and a sink link. The memory controller manages the characteristics of the memory, so that a memory system can be structured utilizing memories of different characteristics.

20 Claims, 9 Drawing Sheets

ROW ADDRESS    : RA0 – RA11 ┆ RA0 – RA12

COLUMN ADDRESS : CA0 – CA10 ┆ CA0 – CA9

| | SLAVE ID#0 | ROW/COLUMN ADDRESS BIT NUMBER #0 | — EN0 |
|---|---|---|---|
| | SLAVE ID#1 | ROW/COLUMN ADDRESS BIT NUMBER #1 | — EN1 |
| 80 — | ⋮ | ⋮ | |
| | SLAVE ID#n | ROW/COLUMN ADDRESS BIT NUMBER #n | — ENn |
| | 82 | 84 | |

|  | d15 | d14 | d13 | d12 | d11 | d10 | d9 | d8 | d7 | d6 | d5 | d4 | d3 | d2 | d1 | d0 |
|---|---|---|---|---|---|---|---|---|---|---|---|---|---|---|---|---|
| 1 BANK | 0 | 0 | 0 | 0 | 0 | 0 | 0 | 0 | 0 | 0 | 0 | 0 | 0 | 0 | 0 | 1 |
| 65535 BANK | 1 | 1 | 1 | 1 | 1 | 1 | 1 | 1 | 1 | 1 | 1 | 1 | 1 | 1 | 1 | 1 |

FIG. 13

SLAVE ID

MEMORY SYSTEM CAPABLE OF SUPPORTING DIFFERENT MEMORY DEVICES AND A MEMORY DEVICE USED THEREFOR

BACKGROUND OF THE INVENTION

1. Field of the Invention

The present invention relates to a memory system and a semiconductor memory device used therefor, and more particularly relates to a high speed memory system and a semiconductor memory device for the system achieving high speed transfer of a large amount of data.

2. Description of the Background Art

The performance of a microprocessor has been improved, and the storage capacity of a Dynamic Random Access Memory (DRAM) as a memory device is increasing. However, a large amount of data (including instructions) requested by the microprocessor cannot be transferred at high speed from the DRAM to the microprocessor since the operation speed of the DRAM is slower than that of the microprocessor. Therefore, a high speed memory system has been proposed in which a memory controller/processor and a plurality of DRAMs are connected by a bus, and data are consecutively transferred in synchronization with a clock signal. As one example of the high speed memory system, a memory system employing a high speed memory interface referred to as "Sync Link" will be described in the following.

Figure 16:
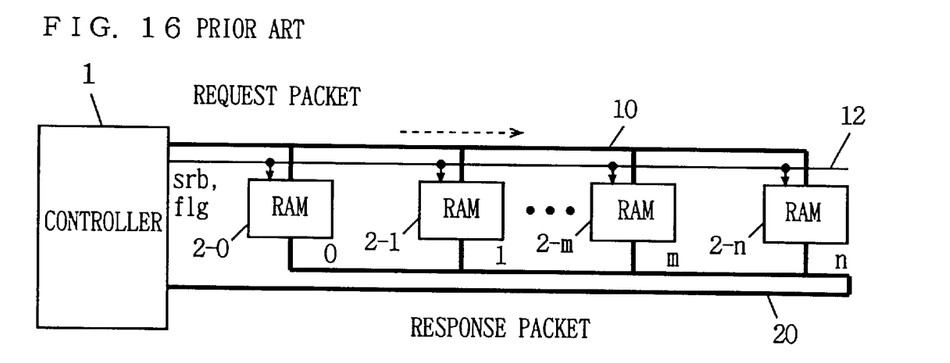
FIG. 16 is a schematic representation of a structure of a high speed memory system which has been proposed conventionally.

FIG. 16 is an illustration showing a structure of a general Sync Link memory system. In FIG. 16, the memory system includes: a controller 1; a send link 10 transmitting a request packet output from controller 1; memories (RAMs) 2-0 to 2-n located in parallel and connected to send link 10 in parallel with each other and executing a designated operation according to the request packet supplied via send link 10; a sink link 20 commonly coupled to memories 2-0 to 2-n transmitting a response packet read from a selected memory to controller 1; and a control bus line 12 transmitting a flag flg and a strobe srb which are operation timing signals from controller 1.

Strobe srb on control signal bus 12 defines an operation speed and an operation timing of controller 1 and memories 2-0 to 2-n, and flag flg indicates the start of a packet transmitted onto send link 10. Send link 10 transmits the request packet from controller 1 in one direction only, while sink link 20 transfers the response packet output from memories 2-0 to 2-n only in one direction toward controller 1. The request packet includes a slave ID (identifier) for identifying each of the memories 2-0 to 2-n, a command which instructs an operation to be executed, and information on address and write data, for example. The response packet transferred onto sink link 20 includes only read data in a normal operation.

As for the path along which the request packet is transferred from controller 1 to the memories and the response packet is transferred from the memories via sink link 20, the length of the packet transferred path for each of memories 2-0 to 2-n is made equal. Accordingly, sink link 20 includes a portion coupled to memories 2-0 to 2-n transferring the response packet output from a selected memory in the direction away from controller 1, and a portion transferring the response packet in the direction toward controller 1. The packet transfer path of the same distance allows controller 1 to take the same period of time for each of memories 2-0 to 2-n, from outputting the request packet to obtaining the response packet, and synchronized packet transfer is thus easily implemented.

It is noted that controller 1 may be a processor. In the following description, "memory controller" is used as a term referring to both of a controller controlling the access to memories 2-0 to 2-n and a processor having an operational processing function.

Send link 10 generally has a width of 8 or 9 bits, and sink link 20 has a bit width two times larger than that of send link 10.

Figure 17:
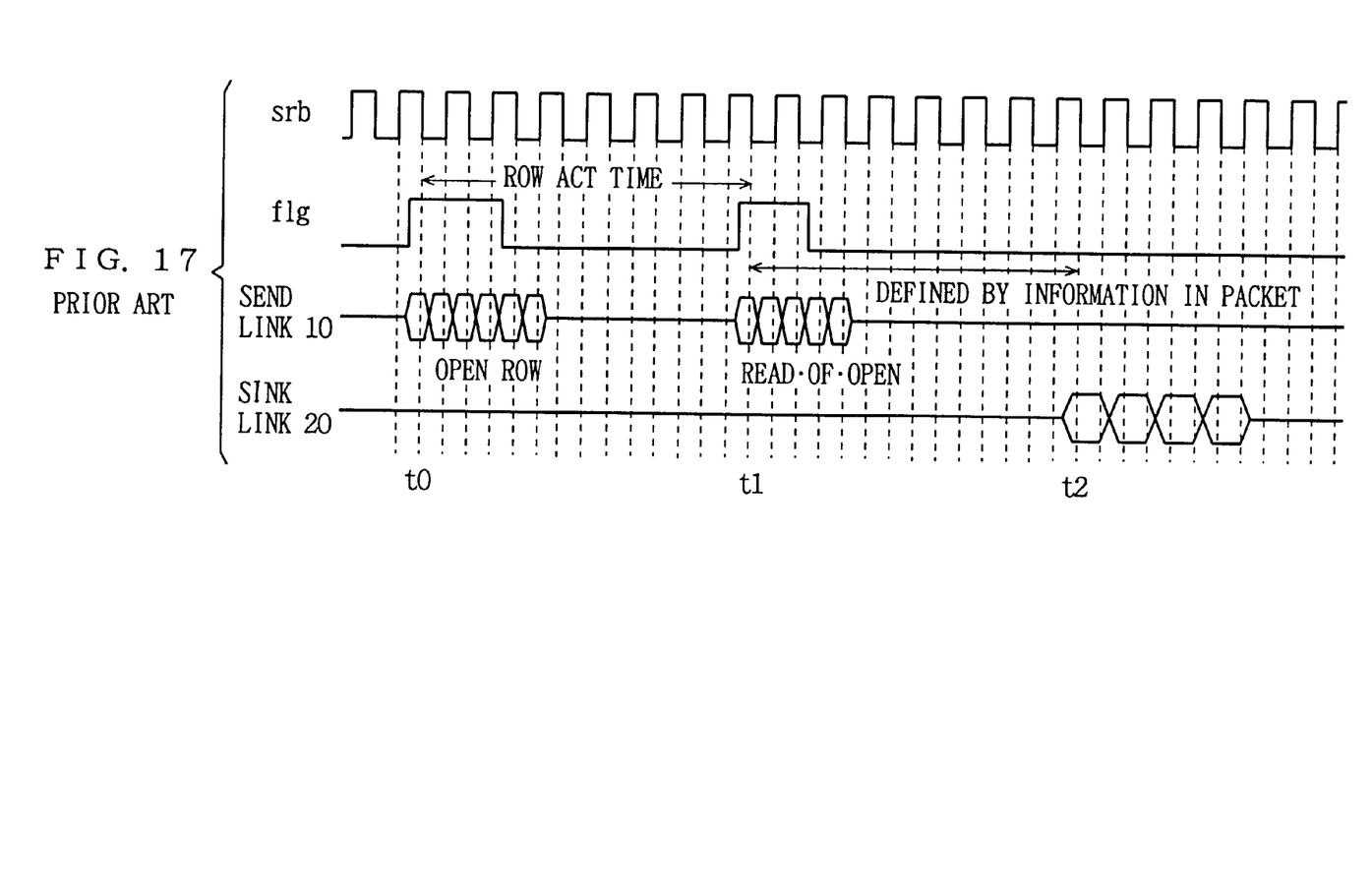
FIG. 17 shows a sequence of request packet transfer at the time of data reading in the memory system shown in FIG. 16.

FIG. 17 is a timing chart at the time of data reading of the memory system. Referring to FIG. 17, a data reading operation will be described.

At time t0, "open.row" request is generated. Prior to sending of an open.row packet at time t0, a flag flg is raised from "0" to "1". Transfer of the packet is instructed by the rise of flag FIG. The open.row packet includes a slave ID (identifier) designating one of memories 2-0 to 2-n, a command indicating the open-row, and an address designating a row to be opened. In the case of the open.row, an addressed row in a designated memory 2-i is selected. At this time, only a row select operation is performed, and data in a memory cell connected to the selected row is not output. Therefore, there is no output of a response packet on sink link 20.

At time t1, a "read.of.open" request is output. At time t1, flag flg is also raised from "0" to "1", and transfer of a packet is instructed. The "read-of-open" request instructs to select a necessary memory cell out of memory cells connected to the row selected by the open.row command and to read data. In other words, the read.of.open corresponds to an ordinary "page hit" state. The request packet on send link 10 is taken into the addressed memory at both of the rise and fall edges of strobe srb. A time period required for the addressed row to be selected in the addressed memory (corresponding to RAS-CAS delay time tRCD of an ordinary DRAM) is needed between time t0 and time t1.

According to the read.of.open, from the addressed memory, corresponding data in the addressed memory cell is read. The data in the addressed memory cell is sent onto sink link 20 at time t2. The time between time t1 and time t2 is defined by information included in the request packet. The response packet (read data) onto sink link 20 is taken into controller 1 at one of rise and fall of strobe srb.

The bit width of send link 10 is one half that of sink link 20, while the sampling rate on send link 10 is two times higher than that of sink link 20. The data transfer rate is accordingly the same. The request packet and the response packet are transferred respectively on send link 10 and sink link 20, so that data can be consecutively transferred between the memory controller and the memory by sending the request packet to one memory while sending the response packet to memory controller 1 from another memory.

Figure 18:
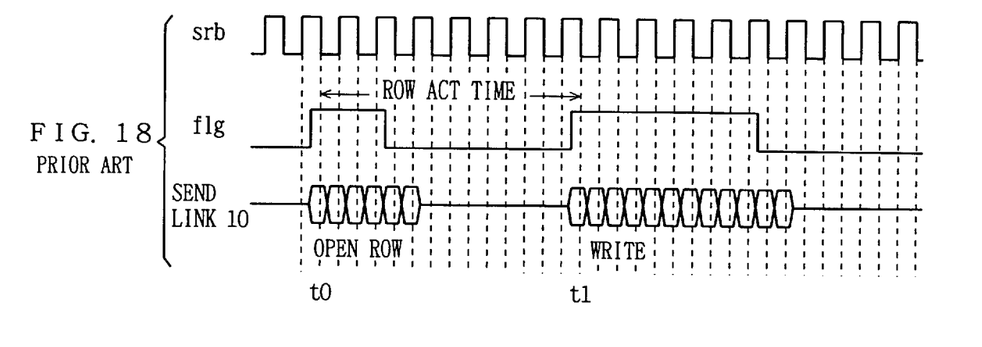
FIG. 18 is a timing chart showing the timing of transfer of a request packet for writing data in the memory system shown in FIG. 16.

FIG. 18 is a timing chart representing an operation at the time of data writing in the memory system shown in FIG. 16. At the time of data writing, transfer of request packet is also indicated by the rise of flag flg from "0"to "1" prior to time t0. A request packet instructing the open.row is sent onto send link 10. An addressed row is selected in an addressed memory by the open.row.

After an elapse of row act time (tRCD), a request packet instructing a write operation is sent at time t1. The request packet instructing the write operation includes a slave ID for identifying a memory, write data, a command indicating writing of data, and the number of write data. When the write request packet is sent at time t1, data is written to an addressed memory cell (column) on the row selected by the open.row in the addressed memory. In the case of the write.request packet, a data packet is not sent onto the sink link since only the writing of data is executed and there is no sending of the response packet.

At the time of data writing access, only the sending of the request packet is performed using send link 10. Therefore, the response packet can be sent using sink link 20 in parallel with the data writing operation, and high speed data transfer can thus be possible.

Figure 19A:
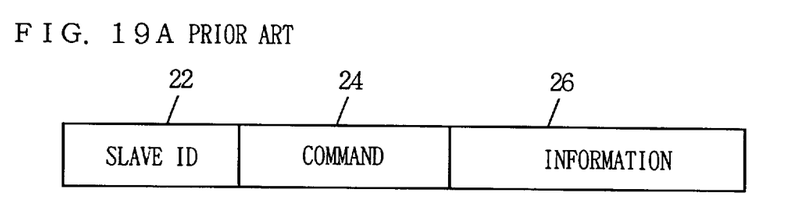
FIGS. 19A and 19B respectively show structures of a request packet and a response packet.
Figure 19B:
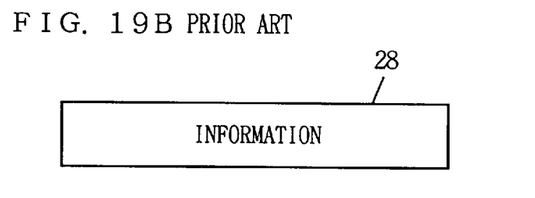

FIGS. 19A and 19B show structures of packets transmitted and received by the controller. FIG. 19A illustrates a request packet. The request packet includes an identifier area 22 storing a slave ID (identifier) for identifying the memory, a command area 24 storing a command instructing an operation to be executed, an information area 26 storing information about, for example, address, time to start a response, number of transfer data byte, and write data. FIG. 19B illustrates a structure of a response packet. A response packet 28 is only transmitted according to a request packet and includes only the information which is read data.

As is described above, when information is transmitted in the form of a packet, the size of the area included in each packet is defined. Therefore, the bit number of address information or the like could be constant. The memory controller has no knowledge about information specific to a memory constituting a memory system (size of address bit number of row/column address, storage capacity, and bank number), so that memories employed in the memory system should have the same structure, and a problem of lack of flexibility in structuring the memory system occurs. In other words, if a nonvolatile memory is used in addition to the dynamic random access memory (DRAM) as a memory in the memory system, the memory system cannot be structured when these address configurations are different, and a problem of the lack of flexibility of the system arises.

Further, when the memory system is utilized in a system which processes image data while executing an ordinary operational processing, a memory for storing the image data and a memory for storing data used in the operational processing are often used separately in the memory system. In this case, if respective characteristics of the memory for storing image data and the memory for storing data (instruction and data) used for the operational processing are different, the memory controller cannot acknowledge the characteristics of the individual memories constituting the memory system. As a result, a memory system cannot be structured utilizing memories of different types or characteristics. Accordingly, the use of the memory system is limited and generality of the system is adversely affected.

SUMMARY OF THE INVENTION

An object of the present invention is to provide a memory system and a semiconductor memory device for the memory system capable of mixedly employing memories having different characteristics.

Another object of the present invention is to provide a semiconductor memory device which can be easily incorporated in a high speed memory system.

A semiconductor memory device according to a first aspect of the invention is provided with circuitry for storing specific information representing inherent characteristics, and an output circuit for transferring the specific information stored in a storing unit onto a bus according to a transfer instruction command supplied via the bus.

A memory system according to a second aspect of the invention includes a memory controller, and a plurality of semiconductor memory devices connected in parallel with each other to the memory controller via first and second buses. Each of the plurality of semiconductor memory devices is provided with a storing unit for storing specific information inherent to the semiconductor memory device, and output circuit for transmitting the specific information stored in the storing unit onto the second bus according to a transfer instruction command supplied via first bus.

Since the information inherent to respective semiconductor memory devices is transferred to the memory controller, the memory controller can manage the specific information for respective memories (semiconductor memory devices), and achieve an efficient address mapping, so that a memory system can easily be structured under the management of the memory controller even if the memories have different characteristics.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[First Embodiment]

Figure 1:
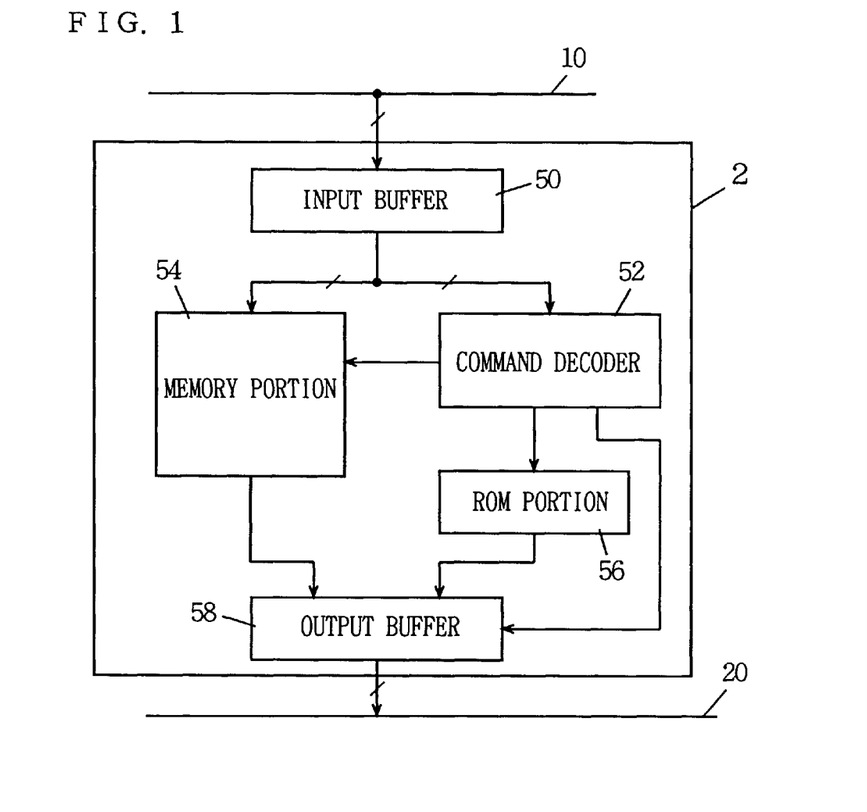
FIG. 1 schematically shows an entire structure of a memory according to the present invention.

FIG. 1 schematically shows an entire structure of a memory according to the present invention. In FIG. 1, a memory 2 includes: an input buffer 50 receiving a request packet from send link 10; a command decoder 52 receiving the request packet via input buffer 50, decoding a command included in the request packet, and generating a control signal according to the result of decoding; a memory portion 54 having a plurality of memory cells arrayed in rows and columns and accessing a memory cell addressed according to address information supplied via input buffer 50 under the control of command decoder 52; an ROM portion 56 storing specific information inherent in memory 2; and an output buffer 58 transmitting information of one of memory portion 54 and ROM portion 56 onto sink link 20 at prescribed timing under the control of command decoder 52. ROM portion 56 reads the stored specific information and supply it to output buffer 58 under the control of command decoder 52.

Command decoder 52 is activated when a slave ID (identifier) included in the request packet supplied via send link 10 is the same as a slave ID stored in an identifier register (not shown), and decodes the command of the request packet supplied from input buffer 50. The identifier of memory 2 is the one allocated to each of the memories at an initialization sequence, as shown under "RAM" in FIG. 16. The slave ID is incremented one by one starting from zero, starting at the memory nearest to controller 1. The initialization sequence is executed through a path which is not shown in the figure. The initialization sequence of the slave ID includes the following steps.

An initialization command is supplied via send link 10 and all of the slave IDs of memory 2 are set at an initial value (62). Next, the controller transfers a slave ID setting command and the slave ID onto the send link, and outputs a slave ID input enable signal for a memory adjacent to the controller via a path not shown in FIG. 16. The memory 2-0 nearest to the controller (see FIG. 16) stores data supplied on the send link as its own slave ID when the slave ID enable signal is activated. After the storing of the slave ID, the memory transmits the slave ID input enable signal to an adjacent memory. The memory takes the slave ID supplied on the send link and stores it as its own identifier only when the slave ID input enable signal is supplied. After the storing of the slave ID by the last memory is completed, the memory of the final stage transfers an identifier store completion signal (slave ID input enable signal) to the memory controller. The memory controller thus recognizes that the slave IDs of all of the memories included in the memory system have been set.

After the initialization sequence, the memory controller reads the specific information included in each memory 2. The structure of the memory system is the same as that shown in FIG. 16. A sequence of reading specific information according to the first embodiment of the present invention is hereinafter described referring to the flow chart shown in FIG. 2.

Figure 2:
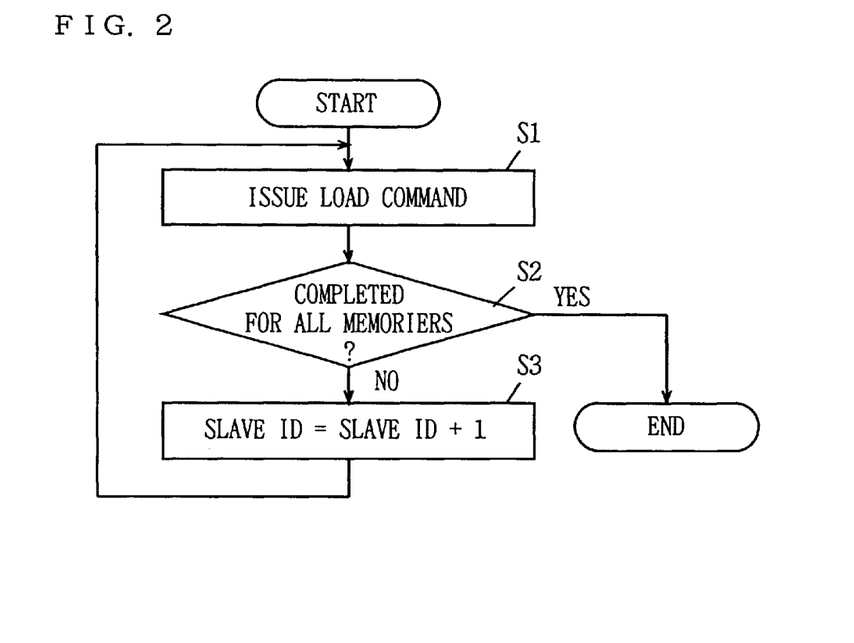
FIG. 2 is a flow chart representing an operation of a memory controller for the memory shown in FIG. 1.

After the initialization sequence is completed and all of the memories included in the memory system store respective slave IDs, memory controller (1) sends a load command with slave ID onto send link 10 (Step S1). Receiving the load command, command decoder 52 in a memory designated by slave ID operates to decode the load command, and gives ROM 56 a command to read the stored information. ROM portion 56 reads the stored information and supplies it to output buffer 58 under the control of command decoder 52. Output buffer 58 sends the specific information onto sink link 20 at a prescribed timing under the control of command decoder 52. The specific information sent onto sink link 20 is transmitted to the memory controller.

Memory controller then determines whether the load command has been issued to each of the memories (Step S2). The determination is made within the memory controller by comparing a slave ID being issued and a slave ID having the maximum value in the memory system. If the load command has not been issued for all of the memories, the memory controller increments slave ID by 1 (Step S3), and returns to Step S1. When it is determined that the issuance of the load command is completed for all of the memories in Step S2, the load operation of the specific information is completed.

The memory controller controls information specific to the memory for each slave ID by issuing the load command for all of the memories included in the memory system, and the memory controller can thus flexibly control the memory system according to the specific information.

Figure 3:
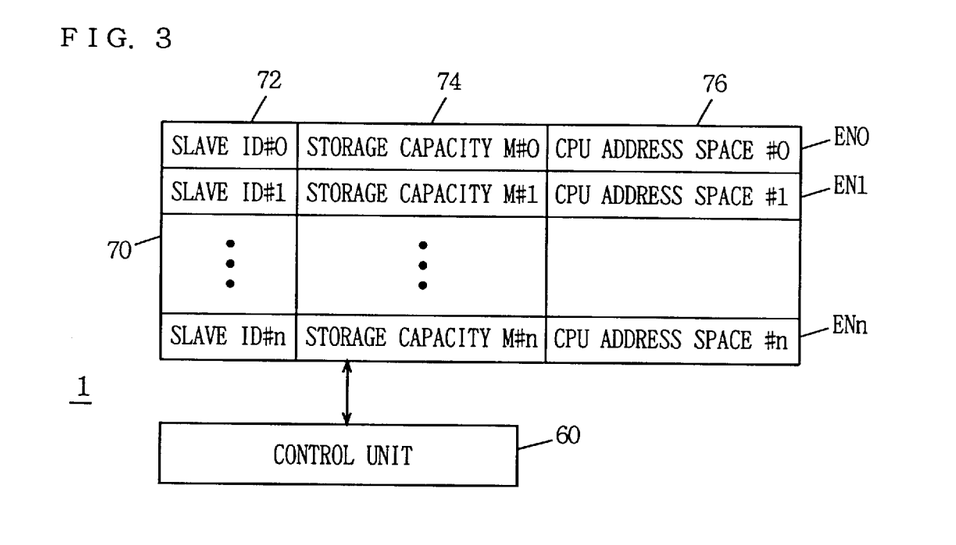
FIG. 3 schematically shows a structure of a memory management table of the memory controller according to the first embodiment of the invention.

FIG. 3 shows a method of controlling in the memory controller when the specific (inherent) information is the one indicating the storage capacity of memory 2. As shown in FIG. 3, memory controller 1 includes a control unit 60 which controls transmission and reception of the request packet and the response packet, and a memory management table 70 for controlling information specific to each of the memories included in the memory system. Memory management table 70 includes an identifier area 72 storing slave IDs for respective memories included in the memory system, a storage capacity area 74 storing the storage capacity of each of the memories, and an address store area 76 storing CPU address space allocated to each of the memories. Slave ID for each of memories 2-0 to 2-n, the storage capacity, and the CPU address space are coupled with each other and constitute one entry, and stored in management table 70. Accordingly, memory management table 70 includes entries EN0–ENn respectively corresponding to memories 2-0 to 2-n provided in the memory system.

Memory 2-0 identified by slave ID#0 has storage capacity M#0 and CPU address space #0 is allocated to memory 2-0. By referring to memory management table 70, control unit 60 can identify a memory corresponding to an address area to which the processor requests accessing. The control unit 60 thus can easily transfer a requested packet to a memory storing information to which the processor (CPU) requests accessing.

By the use of memory management table 70 shown in FIG. 3 and the control of specific information for each of the memories, the CPU address space can be allocated according to each storage capacity even if memories 2-0 to 2-n have different storage capacities. A memory system can thus be structured easily when memories of different capacities are utilized.

A condition required for memories 2-0 to 2-n is that each of them has an input buffer (input interface) coupled to send link 10 and an output buffer (output interface) coupled to sink link 20. As long as the interface condition is fulfilled, a memory system can be structured employing memories of optional characteristics, and the memory controller can flexibly execute allocation of addresses and so on according to the characteristic of each memory (specific information).

Writing of the storage information as well as the storage capacity information to ROM portion 56 has already been completed before the shipment of memory 2. ROM portion 56 can be comprised of an EPROM (erasable programmable read only memory) as well as an EEPROM referred to as a flash memory as long as it can store information in non-volatile manner. A masked ROM to which the storage capacity information is written by a specific mask may be utilized.

Figure 4A:
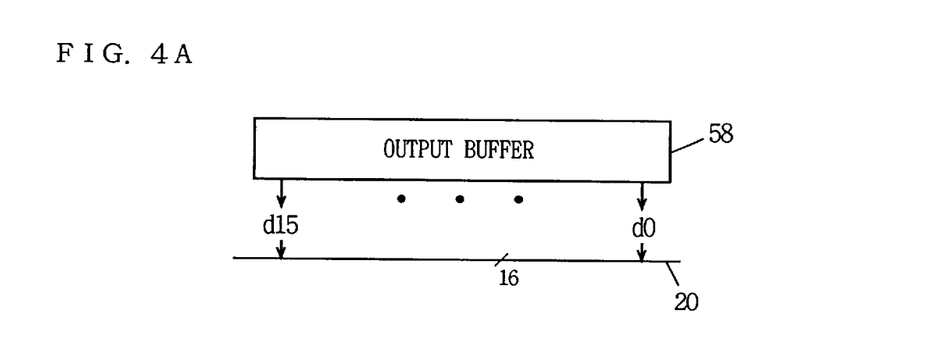
FIG. 4A shows an output bit structure of an output buffer in the memory shown in FIG. 1.
Figure 4B:
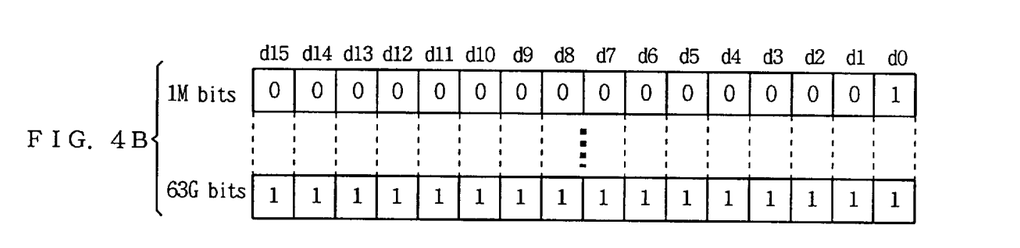
FIG. 4B shows a correspondence between the output bit of the output buffer and storage capacity.

FIGS. 4A and 4B show, as one example, the way how the storage capacity information is output. Output buffer 58 is supposed to have sixteen data output nodes (terminals) d0–d15. It is not necessary for ROM portion 56 to have an output structure of 16 bit width. ROM portion 56 may be of 8 bit width, or 8 bit data from ROM portion 56 may be converted to 16 bit data in output buffer 58 (it is sufficient for 8 bit data to be successively read out from ROM portion 56). As shown in FIG. 4A, output buffer 58 is supposed to output 16 bit data d0–d15 to sink link 20. In this case, suppose that storage capacity of 1M bits is represented by the least significant bit d0 of 1 and residual bits d1–d15 of "0", as shown in FIG. 4B, maximum storage capacity of 63G bits can be represented on the basis of 1M bits. Accordingly, for example, if the storage capacity of memory 2 is 16M bits, information showing the storage capacity is as follows.

$$d\langle 15:0\rangle = (0, 0, 0, 0, 0, 0, 0, 0, 0, 0, 0, 1, 0, 0, 0, 0)$$

The memory controller can thus allocate CPU address space according to the storage capacity information. The allocation of the address space is appropriately adjusted depending on the bit number that one address includes. When one address stores 16 bits of data, 16M bit storage capacity corresponds to an addresses space of addresses 0 to $2^{20}-1$.

As described above, even if a memory system is structured employing memories of different storage capacities, CPU address space can easily be allocated to each of the memories in a memory controller by utilizing, as specific information, information about the storage capacity of the memory. Therefore, the memory system can be structured utilizing memories having a plurality of different storage capacities.

[Second Embodiment]

Figure 5A:
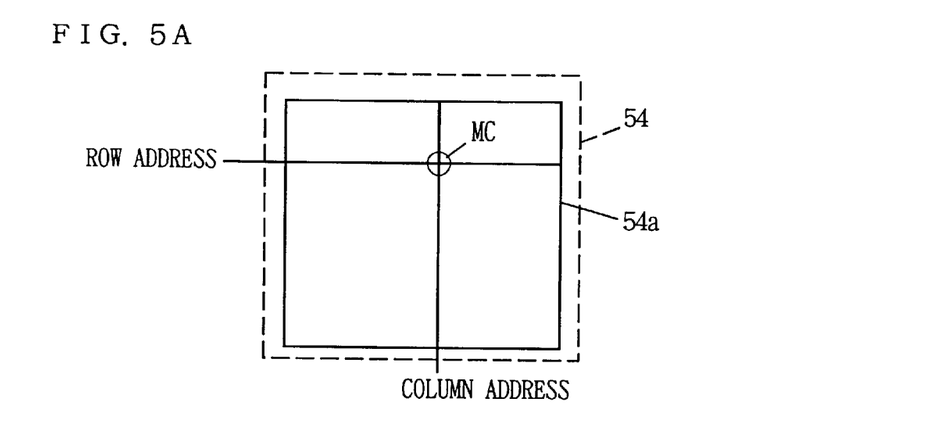
FIG. 5A schematically shows a structure of an array portion of the memory in FIG. 1.

FIG. 5A schematically shows a structure of a memory array 54a included in memory portion 54 in FIG. 1. In FIG. 5A, memory array 54a includes a plurality of memory cells MCs arrayed in a matrix of rows and columns. In memory array 54a, memory cell MC is designated by a row address and a column address. Row address designates a row in memory array 54a, and column address designates a column in memory array 54a.

Figure 5B:
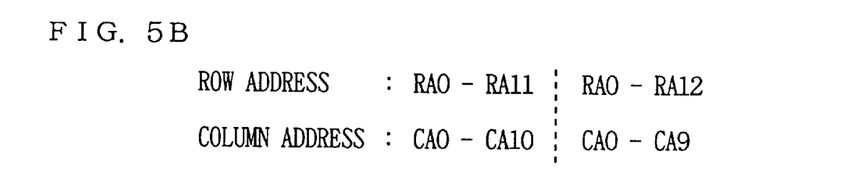
FIG. 5B shows structures of row and column addresses for designating a memory cell.

As shown in FIG. 5B, in the memories having the same storage capacity, the bit number of row address and that of column address are different. Memory array 54a is usually divided into a plurality of blocks, and locations of the blocks selected at the same time are often different. In FIG. 5B, address arrangements are exemplary shown in which one memory is provided with row addresses of address bits RA0–RA11 and column addresses of address bits CA0–CA10, and the other memory is provided with row addresses of address bits RA0–RA12 and column addresses of address bits CA0–CA9. When the bit number of row addresses and column addresses are different from memory to memory, the memory controller is informed of the address bit number.

Figure 6:
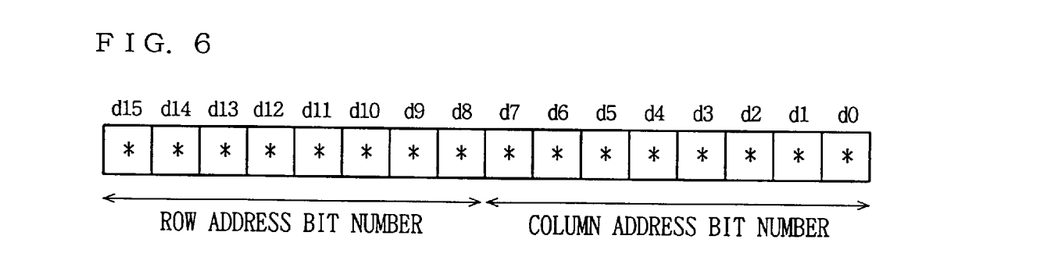
FIG. 6 is an illustration showing the manner in which address bit number information is transmitted according to the second embodiment of the present invention.

FIG. 6 illustrates a structure when specific information inherent in the memory is given to the memory controller, according to the second embodiment of the present invention. FIG. 6 also shows, as one example, that the output buffer sends 16 bits d15–d0 onto sink link 20 as shown in FIG. 4A. In this structure, as shown in FIG. 6, suppose that the upper byte (8 bits) d15–d8 is used as an area storing information about the bit number of row address, and the lower byte d7–d0 is used as an area storing information about the bit number of column address. In this case, the bit number of row/column addresses can be represented respectively in the range of 1 to 255 bits. For example, if row address is 10 bits and column address is 8 bits, the information can be represented as follows.

$$D\langle 15:0\rangle = (0, 0, 0, 0, 1, 0, 1, 0, 0, 0, 0, 0, 1, 0, 0, 0)$$

Figure 7:
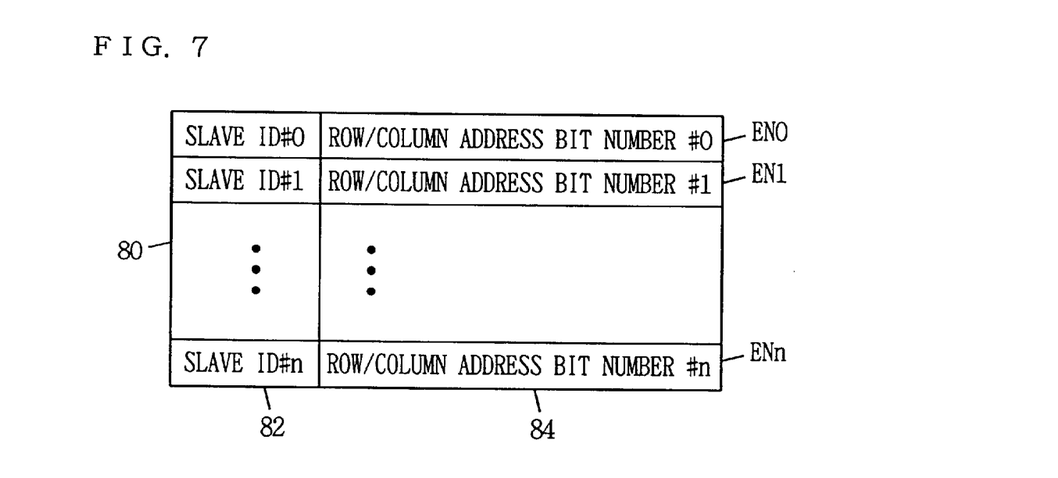
FIG. 7 schematically shows a structure of a memory management table provided in the memory controller according to the second embodiment of the invention.

The information on the address bit number of the memory is stored in a memory management table 80 as shown in FIG. 7. Memory management table 80 includes an identifier store area 82 which stores slave ID for identifying respective memories, and an address bit number store area 84 which stores information on row/column address bit number of respective memories. Entries EN0–ENn are provided corresponding to respective memories. Accordingly, information on row/column address bit number corresponding to respective identifiers are stored.

Figure 8:
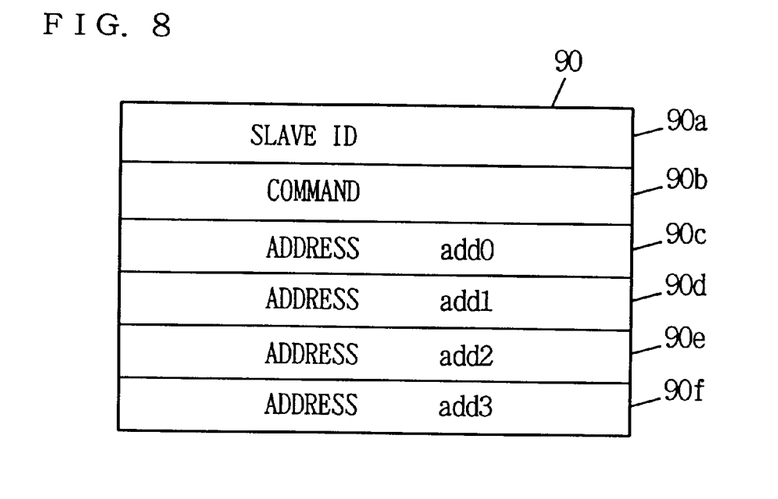
FIG. 8 schematically shows a structure of a request packet transmitted via a send link from the memory controller to the memory.

FIG. 8 shows a structure of a request packet. In FIG. 8, a request packet 90 includes a field 90a storing slave ID for designating a memory included in the memory system, a field 90b storing a command indicating a process to be executed, and fields 90c–90f storing addresses add0–add3. Fields 90a–90f are respectively transferred sequentially in synchronization with the rise and fall of strobe srb. The bit number of fields 90a–90f is constant (determined according to the bit width of the send link). In this case, addresses are distributed in the memory as follows.

Figure 9:
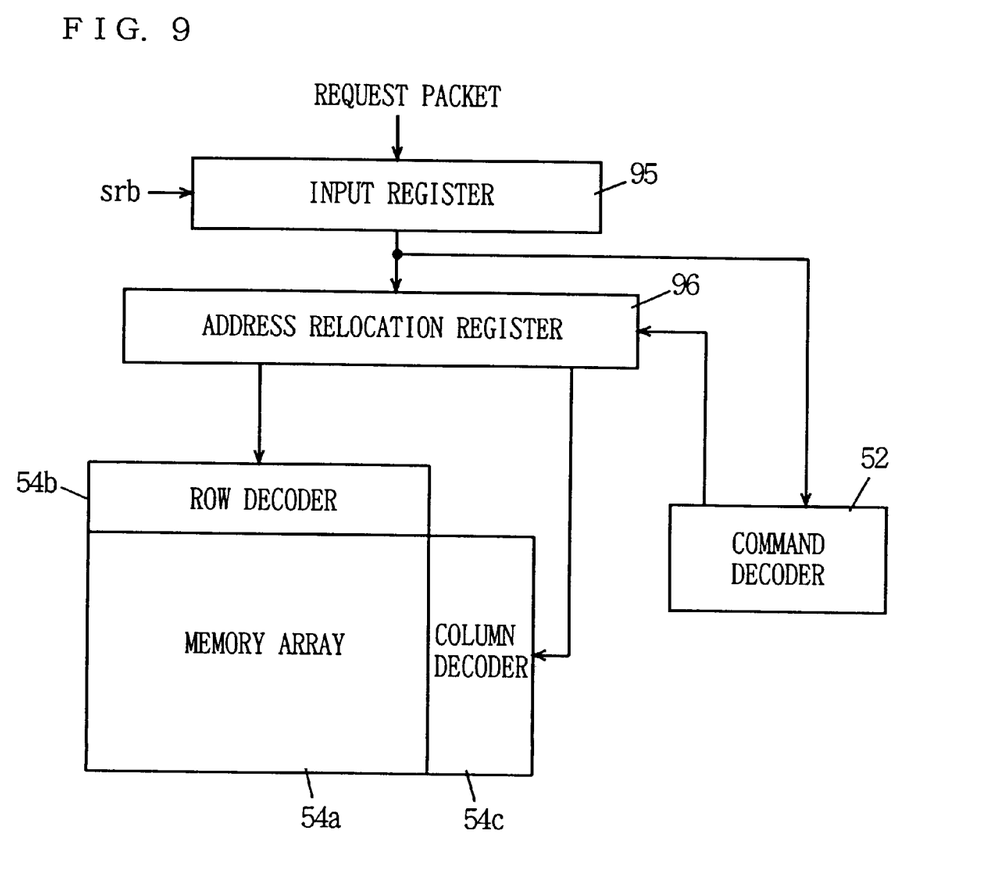
FIG. 9 is a schematic illustration of a structure of a main portion of the memory according to the second embodiment of the present invention.

FIG. 9 illustrates a structure of a main portion of the memory. In FIG. 9, the memory includes: an input register 95 successively storing the request packet in synchronization with strobe srb; command decoder 52 decoding a command and generating a necessary control signal when the memory is addressed, according to slave ID and the command supplied from input register 95; an address relocation register 96 successively storing the address supplied from input register 95 under the control of command decoder 52; a row decoder 54b decoding the row address supplied from address relocation register 96 and selecting a row in memory array 54a; and a column decoder 54c decoding the column address from address relocation register 96 and selecting a column in memory array 54a.

Address relocation register 96 is activated by command decoder 52, and stores addresses supplied from input register 95 successively from, for example, upper bits. A prescribed bit number in address relocation register 96 (row address bit number of the memory) is provided to row decoder 54b, and residual address bits are supplied to column decoder 54c. Row decoder 54b and column decoder 54c are activated/deactivated by the control signal from command decoder 52 (the path is not shown).

Accordingly, the use of address relocation register 96 allows addresses included in the request packet transmitted from the memory controller to be distributed easily to suitable row/column addresses in the memory.

At the time of the page hit (read.of.open) operation, only the column address is provided. In this case, command decoder 52 causes address relocation register 96 to store an address supplied from input register 95 only in the portion corresponding to the column address.

Using the structure shown in FIG. 9, a memory system can be structured employing memories of different address bit numbers.

Figure 10:
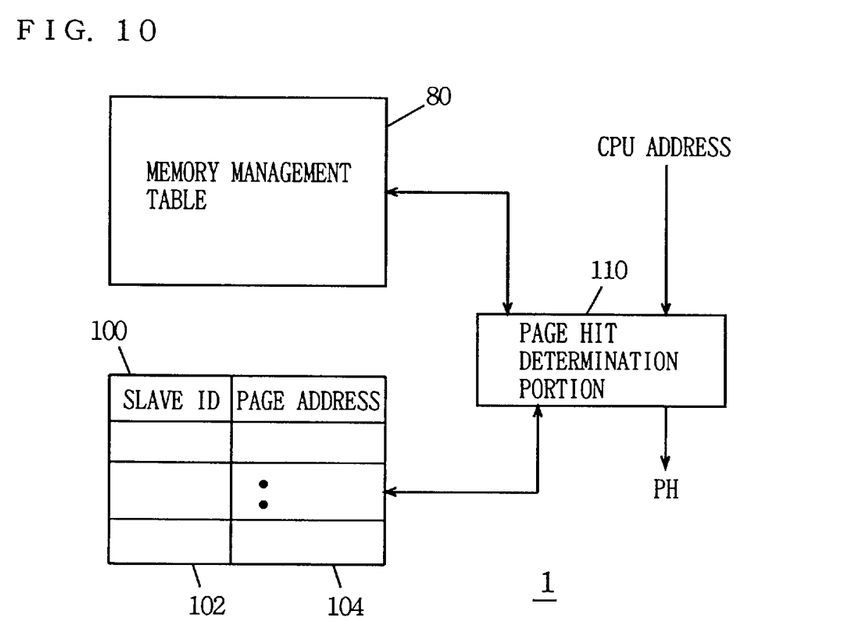
FIG. 10 is an illustration showing how the memory management table in the memory controller is utilized, as one example, according to the second embodiment of the invention.

FIG. 10 illustrates a structure of a main portion of a memory controller. In FIG. 10, memory controller 1 includes memory management table 80, a page memory 100 storing addresses of pages (rows) selected respectively in the memories of the memory system, and a page hit determination portion 110 receiving an address from a processor (CPU) and determining whether the selected page is addressed or not referring to memory management table 80 and page memory 100. The memory is supposed to be a dynamic random access memory (DRAM).

Page memory 100 includes an identifier area 102 storing slave ID specifying each of the memories, and a page address area 104 storing a page address (row address) selected in each memory. Page hit determination portion 110 receives an address (CPU address) from the processor and determines which memory has been designated according to the CPU address (the second embodiment may be used), and retrieves information about row/column address bit number of the addressed memory referring to memory management table 80.

Page hit determination portion 110 extracts a page address (row address) from the CPU address according to the retrieved information on the row address bit number, retrieves corresponding page address from page memory 100, determines whether or not the retrieved page address is coincident with the page address included in the CPU address, and activates/deactivates a page hit instruction signal PH according to the result of the determination. When the page hit is determined, a control unit (not shown) extracts a column address from the CPU address according to information on the bit number of the column address, and generates a request packet.

By storing in memory management table 80, information on the bit number of the row/column address in respective memories, page hit/miss can be easily determined even if the address structures of the memories included in the memory system are different. Based on the result of the determination, an address necessary for generating a packet can easily be produced from the CPU address.

Accordingly, even if the memories have different address configurations, page mode access (open.row.read/write) can be performed according to the address configurations, and the memory access can thus be achieved efficiently.

[Third Embodiment]

Figure 11:
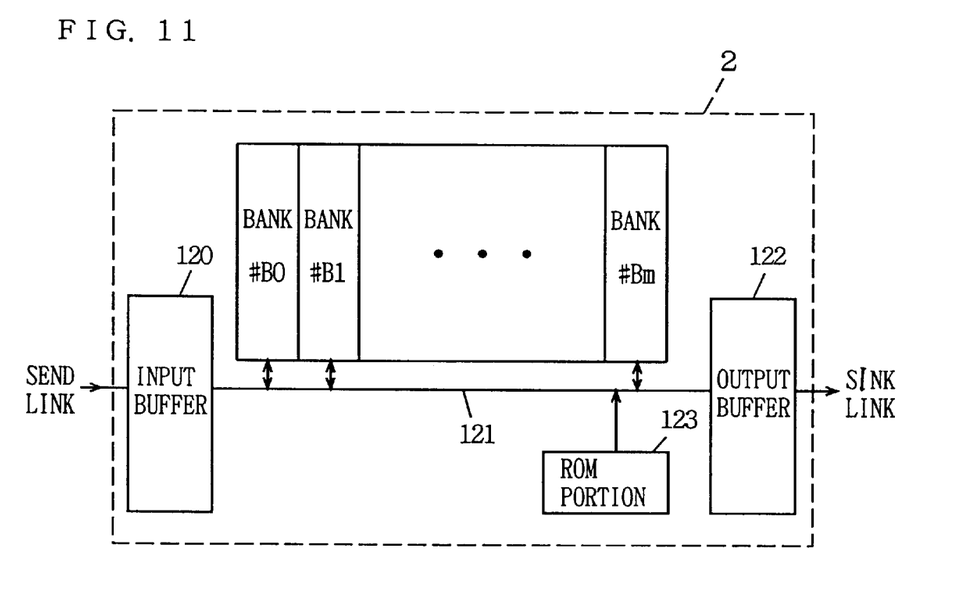
FIG. 11 schematically shows a structure of a main portion of the memory according to the third embodiment of the invention.

FIG. 11 shows a structure of a main portion of a memory according to the third embodiment of the invention. In FIG. 11, memory 2 includes an input buffer 120 receiving a request packet on the send link, banks #B0–#Bm commonly coupled to an internal bus 121 and independently driven to active/inactive state, and an output buffer 122 coupled to internal data bus 121 and outputs information supplied via internal data bus 121 onto sink link as a response packet.

Banks #B0–#Bm are selectively driven to active/inactive state independently of each other according to a bank address under the control of a command decoder (not shown). The number of banks #B0–#Bm included in memory 2 is appropriately determined. Memory 2 includes an ROM portion 123 which stores the number of banks #B0–#Bm. ROM portion 123 corresponds to ROM portion 56 in FIG. 1. Information on the bank number stored in ROM portion 123 is transferred onto the sink link via output buffer 122, and transmitted to the memory controller.

Figure 12:
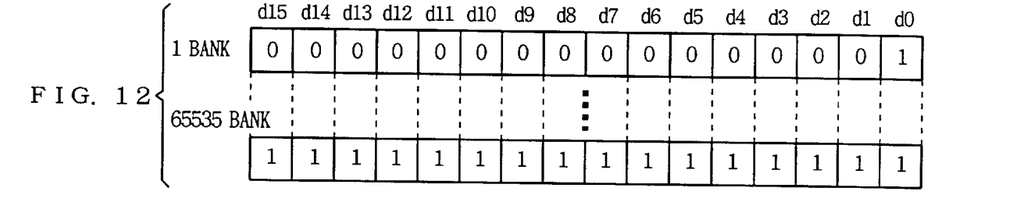
FIG. 12 is an illustration showing how the bank number information is transferred according to the third embodiment of the present invention.

FIG. 12 shows a format of the information on the bank number output from output buffer 122. In FIG. 12, output buffer 122 transmits 16 bits d15–d0 onto the sink link. In this case, the number of the banks can be designated in the range of 1 to 65535 as shown in FIG. 12.

Figure 13:
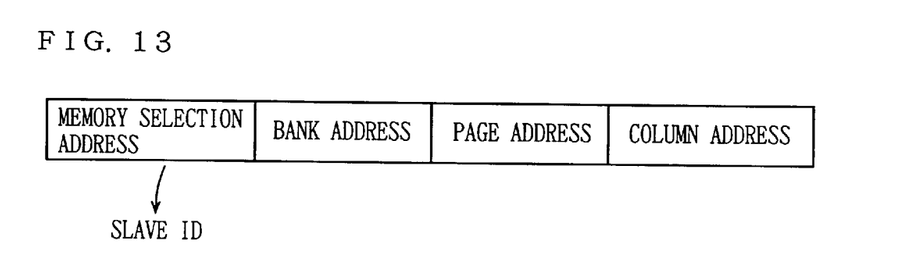
FIG. 13 shows a correspondence between a CPU address and a memory address.

FIG. 13 shows a correspondence between a CPU address and an address output by the memory controller to the memory. As shown in FIG. 13, the CPU address includes a memory selection address designating a memory included in the memory system, a bank address specifying a bank included in the memory, a page address specifying a page (row) included in the bank, and a column address specifying a column on the page. The bit numbers of the bank addresses are different if the numbers of the banks are different. In this case, the bit number of the page addresses varies, accordingly. The memory selection address is correlated to slave ID.

Figure 14:
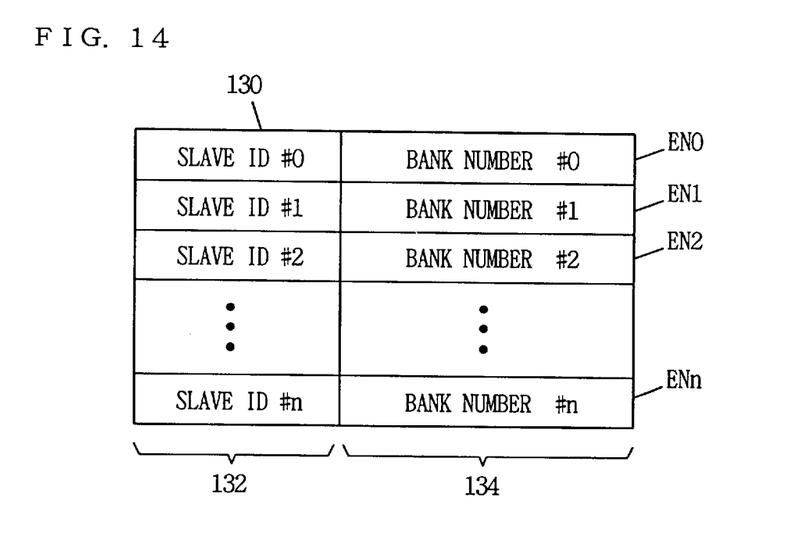
FIG. 14 schematically shows a structure of a memory management table in a memory controller according to the third embodiment of the present invention.

FIG. 14 shows, as one example, a structure of a memory management table 130 included in the memory controller. As shown in FIG. 14, memory management table 130 included in memory controller 1 includes an identifier area 132 storing slave ID (slave ID#0-slave ID#n) specifying each of the memories, and a bank number information store area 134 storing information on the bank numbers #0–#n in each of the memories. Slave ID specifying a memory and the bank number information indicating the number of the banks included in the memory are stored in one entry EN (EN0–ENn). The memory controller controls the number of the banks information of each memory by referring to memory management table 130.

The memory executes an operation of memory cell selection according to the bank address, the page address, and the column address supplied from the memory controller. As the structure of the memory, the structure of FIG. 9 may be utilized, and the addresses supplied from input register 95 are divided into the bank address, the page address, and the column address by address relocation register 96.

Figure 15:
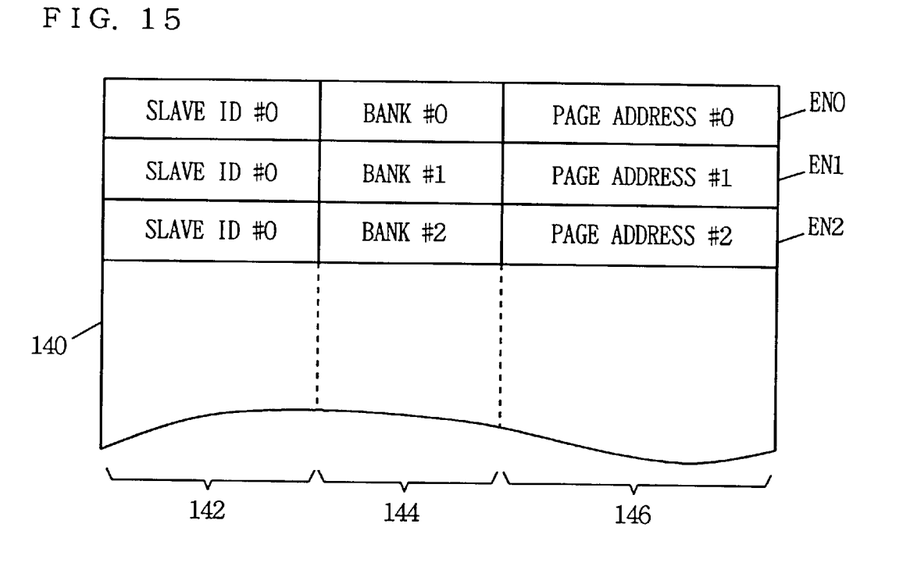
FIG. 15 is an illustration showing how the bank number information is utilized as one example according to the third embodiment of the invention.

FIG. 15 shows a structure of a page memory. In FIG. 15, a page memory 140 includes an identifier area 142 storing slave ID, a bank store area 144 specifying a bank provided corresponding to each slave ID, and a page address area 146 storing a page address indicating a selected page respective banks. The memory controller secures an area for storing a page address of each bank in page memory 140 according to information on the bank number stored in memory management table 130. In FIG. 15, banks #0, #1 and #2 relating to slave ID #0 designating memory 2-0, as well as page addresses #0, #1 and #2 stored for respective banks are representatively shown.

As a structure of the page hit determination portion, a structure similar to that shown in FIG. 10 may be utilized. Page memory 140 shown in FIG. 15 is used in place of page memory 100. In this case, the operation of the page hit determination portion is slightly different. Page hit determination portion 110 identifies the bank address bit from the CPU address according to information on the bank number stored in memory management table 130, reads corresponding page address from page memory 140 using the memory selection address and the bank address as reference addresses, and extracts a page address from the CPU address. Page hit/miss is determined by deciding whether the page address of the CPU address coincides or does not coincide with the page address read from page memory 140.

When the request packet is sent, it is not necessary for the memory controller to distinguish the bank address from the page address. The reason is that the bank address and the page address are separated in memory 2.

As described above, even if the bank numbers of the memories included in the memory system are different, the memory controller can determine the page hit since the storage area is provided for storing information about the number of banks in the memory, and the bank number information is transferred to the memory controller, controlling the bank numbers of respective memories accurately. An efficient access can thus be achieved.

If the page memories 100 and 140 are constituted by a content addressable memory (CAM), the page hit determination portion need not discriminate the bank address from the page address. What is necessary for the page hit determination portion is simply to extract addresses including a memory selection address, a bank address, and a page address from CPU addresses. However, the location of the column address should be the same even if the numbers of the banks are different.

As for the memory, the memory may be the one in which random access is possible even if the page mode access cannot be executed, such as a dynamic random access memory, or a memory device of nonvolatile type (for example, a flash memory). A necessary condition of the memory is that it has an input port (input register or input buffer) coupled to a send link and an output port (output buffer or output register) coupled to a sink link.

As for the memory system, the present invention can be applied to a memory system if the memory system is structured such that the information is transferred according to a command from the memory controller, even if the system is not structured to be a bus structure including a send link and a sink link.

According to the present invention, a memory can be incorporated into a memory system if the memory is provided with input/output interface of the memory system, owing to storage means provided for storing information specific to the memory. Therefore, even if the memories of different standards are employed, a memory system can be structured. In other words, a memory system can be structured by selecting a memory suitable for the application of the memory system.

The memory controller can easily achieve allocation of CPU address space, as well as page hit/miss determination according to the characteristics of memories by utilizing information on address bit number, storage capacity, and bank number as information specific to the memories.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device, comprising:
   store means for storing specific information inherent in said semiconductor memory device;
   input means coupled to a first bus for inputting commonly a command instructing an operation performed in a normal mode of operation and a transfer command instructing transference of the specific information both transmitted through said first bus;
   output means coupled to said input means for sending the specific information stored in said store means onto a second bus according to the transfer command supplied via said input means; and
   a memory array including a plurality of memory cells for storing information other than said specific information.

2. The semiconductor memory device according to claim 1, wherein
   said specific information indicates a storage capacity of said semiconductor memory device.

3. The semiconductor memory device according to claim 1, wherein said memory cells are arrayed in rows and columns and addressed by a multi-bit row address and a multi-bit column address, and
   said specific information indicates bit number of said multi-bit row address and said multi-bit column address.

4. The semiconductor memory device according to claim 1, further comprising a plurality of banks operating independently of each other, wherein
   said specific information indicates number of said banks.

5. The semiconductor memory device according to claim 1, wherein said second bus is provided separately from said first bus transferring said transfer command.

6. The semiconductor memory device according to claim 1, wherein said store means stores the specific information representing a specific feature of said semiconductor memory device.

7. The semiconductor memory device according to claim 1, wherein said first bus includes a bus for transferring an address signal as well as the command.

8. The semiconductor memory device according to claim 1, wherein said output means includes a command decoder for receiving a request packet from the first bus, decoding a command included in the request packet, and generating a control signal according to a result of decoding the command, said command including the transfer command and an operation command instructing an access operation in a normal mode of operation.

9. The semiconductor memory device according to claim 1, wherein each of said first bus and said second bus comprises a unidirectional bus.

10. The semiconductor memory device according to claim 1, further comprising a command decoder coupled to said input means for decoding the command received from said input means to generate an operation mode designating signal designating an operation of said memory array and said output means.

11. A memory system comprising:
    a memory controller; and
    a plurality of semiconductor memory devices connected in parallel with each other to said memory controller via first and second buses respectively transferring information, and operating according to a command transmitted via said first bus from said memory controller, wherein
    each of said semiconductor memory devices includes
    store means for storing specific information inherent in said semiconductor memory device,
    input means coupled to said first bus, for inputting commonly a command instructing an operation performed in a normal mode of operation and a transfer command instructing transference of the specific information both transmitted through said first bus, output means transferring the specific information stored in said store means to said memory controller via said second bus, according to the transfer command supplied from said memory controller via said input means, and a memory array including a plurality of memory cells for storing information other than said specific information and provided separately from the store means.

12. The memory system according to claim 11, wherein said specific information indicates a storage capacity of corresponding semiconductor memory device.

13. The memory system according to claim 11, wherein the plurality of memory cells of each of said semiconductor memory devices are respectively addressed by a multibit row address and multibit column address, and said specific information indicates bit number of said multibit row address and said multibit column address of said corresponding semiconductor memory device.

14. The memory system according to claim 11, wherein each of said plurality of semiconductor memory devices includes at least one bank, and when the semiconductor memory device has a plurality of banks, each of said plurality of banks can be driven to active and inactive states independently of each other, and said specific information indicates number of banks included in said corresponding semiconductor memory device.

15. The memory system according to claim 11, wherein said second bus is provided separately from said first bus.

16. The memory system according to claim 11, wherein the specific information in each semiconductor memory device represents a specific feature of each semiconductor memory device.

17. The memory system according to claim 11, wherein said first bus includes a bus for transferring an address signal as well as the command.

18. The memory system according to claim 11, wherein each said output means includes a command decoder for receiving a request packet from the first bus, decoding a command included in the request packet, and generating a control signal according to a result of decoding the command, said command including the transfer command and an operation command instructing an access operation in a normal mode of operation.

19. The memory system according to claim 11, wherein each of said first bus and said second bus comprises a unidirectional bus.

20. The memory system according to claim 6, wherein each of said semiconductor memory devices further includes a command decoder coupled to said input means for decoding the command received from said input means to generate an operation mode designating signal designating an operation of said memory array and said output means.

* * * * *